United States Patent
Pasquero et al.

(10) Patent No.: US 8,456,435 B2
(45) Date of Patent: Jun. 4, 2013

(54) ELECTRONIC DEVICE WITH TOUCH-SENSITIVE DISPLAY AND METHOD OF FACILITATING INPUT AT THE ELECTRONIC DEVICE

(75) Inventors: Jerome Pasquero, Kitchener (CA); David Ryan Walker, Waterloo (CA); Michael Elizarov, Waterloo (CA)

(73) Assignee: Research In Motion Limited, Waterloo (CA)

( * ) Notice: Subject to any disclaimer, the term of this patent is extended or adjusted under 35 U.S.C. 154(b) by 559 days.

(21) Appl. No.: 12/713,345

(22) Filed: Feb. 26, 2010

(65) Prior Publication Data
US 2011/0210923 A1    Sep. 1, 2011

(51) Int. Cl.
*G06G 5/00*    (2006.01)

(52) U.S. Cl.
USPC .................. 345/173; 178/18.03; 715/864

(58) Field of Classification Search
USPC .............. 345/173, 174, 175, 176, 177, 178; 178/18.03–18.09; 715/863, 864
See application file for complete search history.

(56) References Cited

U.S. PATENT DOCUMENTS

| | | | |
|---|---|---|---|
| 2003/0016873 A1* | 1/2003 | Nagel et al. | 382/228 |
| 2004/0135818 A1 | 7/2004 | Thomson et al. | |
| 2004/0210853 A1* | 10/2004 | Detter | 715/864 |
| 2005/0275632 A1 | 12/2005 | Pu et al. | |
| 2009/0007001 A1 | 1/2009 | Morin et al. | |
| 2010/0066695 A1* | 3/2010 | Miyazaki | 345/173 |
| 2010/0293457 A1* | 11/2010 | Peterson | 715/261 |
| 2010/0317446 A1* | 12/2010 | Sakiyama et al. | 463/43 |
| 2011/0041056 A1* | 2/2011 | Griffin et al. | 715/708 |

FOREIGN PATENT DOCUMENTS

WO    2009/034220 A1    3/2009

OTHER PUBLICATIONS

Extended European Search Report, Application No. EP 10154900.4, dated Aug. 16, 2010.

* cited by examiner

*Primary Examiner* — Tom Sheng
(74) *Attorney, Agent, or Firm* — Geoffrey deKleine; Borden Ladner Gervais LLP

(57) ABSTRACT

A method of controlling an electronic device that has a touch-sensitive display includes detecting a touch at an area associated with a character displayed on the touch-sensitive display, adding the character to a character string, identifying, from stored data, objects that at least partially match the character string, determining a next character of ones of the objects identified to yield a set of next characters, increasing a size of an area associated with each character of the set of next characters, and reducing the size of the area associated with each character of the set of next characters with time absent detection of a further touch.

15 Claims, 6 Drawing Sheets

ELECTRONIC DEVICE WITH TOUCH-SENSITIVE DISPLAY AND METHOD OF FACILITATING INPUT AT THE ELECTRONIC DEVICE

FIELD OF TECHNOLOGY

The present disclosure relates to portable electronic devices, including but not limited to portable electronic devices having touch-sensitive displays.

BACKGROUND

Electronic devices, including portable electronic devices, have gained widespread use and may provide a variety of functions including, for example, telephonic, electronic messaging and other personal information manager (PIM) application functions. Portable electronic devices include several types of devices including mobile stations such as simple cellular telephones, smart telephones, wireless PDAs, and laptop computers with wireless 802.11 or Bluetooth capabilities.

Portable electronic devices such as PDAs or smart telephones are generally intended for handheld use and ease of portability. Smaller devices are generally desirable for portability. A touch-sensitive display, also known as a touchscreen display, is particularly useful on handheld devices, which are small and have limited space for user input and output. The information displayed on the touch-sensitive displays may be modified depending on the functions and operations being performed. With continued demand for decreased size of portable electronic devices, touch-sensitive displays continue to decrease in size.

Improvements in electronic devices with touch-sensitive or touchscreen devices are desirable.

BRIEF DESCRIPTION OF THE DRAWINGS

Embodiments of the present disclosure will now be described, by way of example only, with reference to the attached Figures, in which.

DETAILED DESCRIPTION

Figure 1:
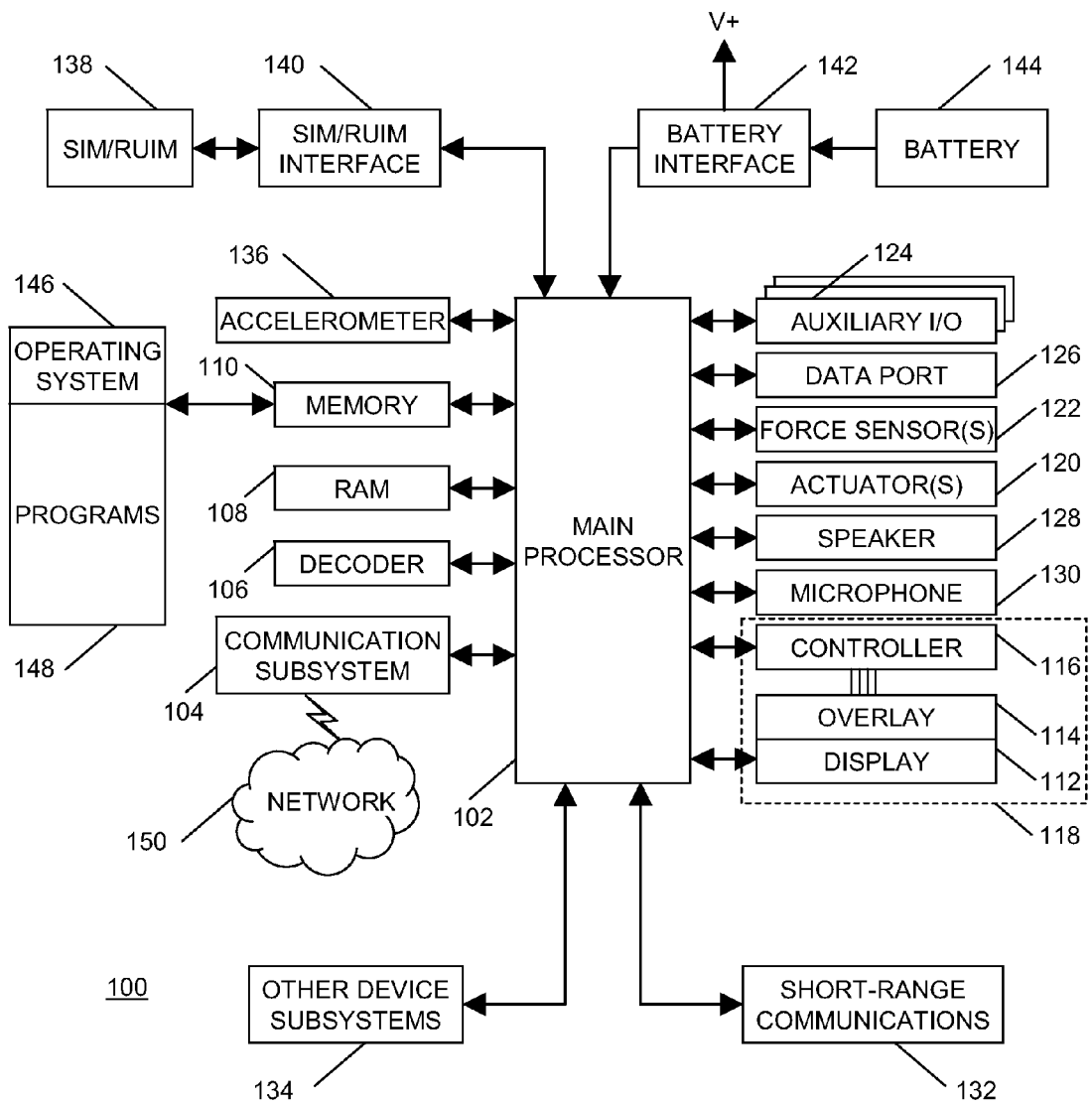
FIG. 1 is a block diagram of an example portable electronic device in accordance with the present disclosure.

The following describes an electronic device that includes a touch-sensitive display and a method of controlling the electronic device. The method includes detecting a touch at an area associated with a character displayed on the touch-sensitive display, adding the character to a character string, identifying, from stored data, objects that at least partially match the character string, determining a next character of ones of the objects identified to yield a set of next characters, increasing the size of the area associated with each next character of the set of next characters, and reducing the size of the area associated with each next character of the set of next characters with time absent detection of a further touch.

For simplicity and clarity of illustration, reference numerals may be repeated among the figures to indicate corresponding or analogous elements. Numerous specific details are set forth to provide a thorough understanding of the embodiments described herein. The embodiments may be practiced without these specific details. In other instances, well-known methods, procedures, and components have not been described in detail so as not to obscure the embodiments described herein. The description is not to be considered as limited to the scope of the embodiments described herein.

The disclosure generally relates to an electronic device, which in the embodiments described herein is a portable electronic device. Examples of portable electronic devices include mobile, or handheld, wireless communication devices such as pagers, cellular phones, cellular smartphones, wireless organizers, personal digital assistants, wirelessly enabled notebook computers, and the like. The portable electronic device may also be a portable electronic device without wireless communication capabilities such as a handheld electronic game device, digital photograph album, digital camera, or other device.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and dual-mode networks that support both voice and data communications. A power source 142, such as one or more rechargeable batteries or a port to another power supply, powers the portable electronic device 100.

The processor 102 interacts with other devices, such as a Random Access Memory (RAM) 108, memory 110, a display 112 with a touch-sensitive overlay 114 operably connected to an electronic controller 116 that together comprise a touch-sensitive display 118, one or more actuators 120, one or more force sensors 122, an auxiliary input/output (I/O) subsystem 124, a data port 126, a speaker 128, a microphone 130, short-range communications 132 and other device subsystems 134. User-interaction with a graphical user interface is performed through the touch-sensitive overlay 114. The processor 102 interacts with the touch-sensitive overlay 114 via the electronic controller 116. Information, such as text, characters, symbols, images, icons, links, and other items that may be displayed or rendered on a portable electronic device, is displayed on the touch-sensitive display 118 via the processor 102. The processor 102 may also interact with an accelerometer 136 that may be utilized to detect direction of gravitational forces or gravity-induced reaction forces.

To identify a subscriber for network access, the portable electronic device 100 uses a Subscriber Identity Module or a Removable User Identity Module (SIM/RUIM) card 138 for communication with a network, such as the wireless network 150. Alternatively, user identification information may be programmed into the memory 110.

The portable electronic device 100 also includes an operating system 146 and software programs or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive, resistive, infrared, or surface acoustic wave (SAW) touch-sensitive display, as known in the art. A capacitive touch-sensitive display includes the display 112 and a capacitive touch-sensitive overlay 114. The overlay 114 may be an assembly of multiple layers in a stack including, for example, a substrate, LCD display 112, a ground shield layer, a barrier layer, one or more capacitive touch sensor layers separated by a substrate or other barrier, and a cover. The capacitive touch sensor layers may be any suitable material, such as patterned indium tin oxide (ITO).

One or more touches, also known as touch contacts or touch events, may be detected by the touch-sensitive display 118. The processor 102 may determine attributes of the touch, including a location of a touch. Touch location data may include an area of contact or a single point of contact, such as a point at or near a center of the area of contact. The location of a detected touch may include x and y components, e.g., horizontal and vertical components, respectively, with respect to one's view of the touch-sensitive display 118. For example, the x location component may be determined by a signal generated from one touch sensor, and the y location component may be determined by a signal generated from another touch sensor. A signal is provided to the controller 116 in response to detection of a touch. A touch may be detected from any suitable object, such as a finger, thumb, appendage, or other items, for example, a stylus, pen, or other pointer, depending on the nature of the touch-sensitive display 118. Multiple simultaneous touches may be detected.

The actuator 120 may be depressed by applying sufficient force to the touch-sensitive display 118 to overcome the actuation force of the actuator 120. The actuator 120 may be actuated by pressing anywhere on the touch-sensitive display 118. The actuator 120 may provide input to the processor 102 when actuated. Actuation of the actuator 120 provides the user with tactile feedback.

Figure 2:
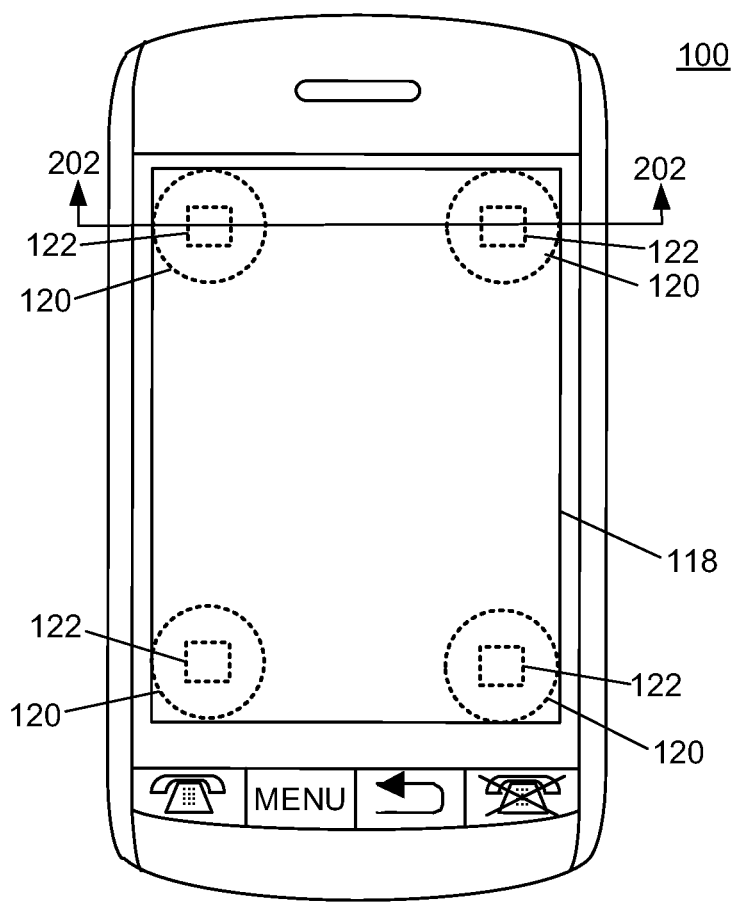
FIG. 2 is a front view of an example of a portable electronic device in accordance with the present disclosure.
Figure 3:
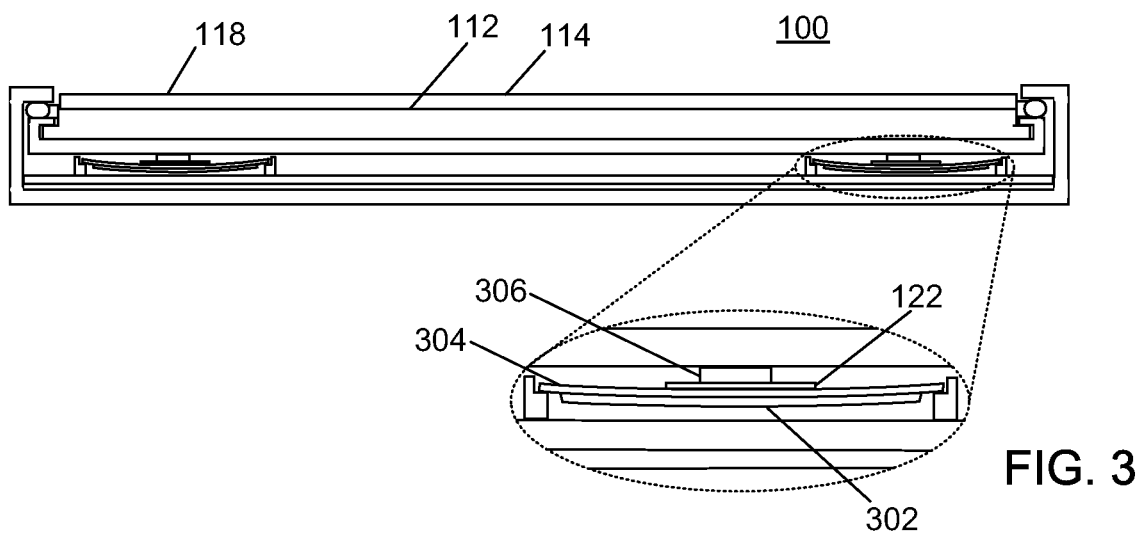
FIG. 3 is a sectional side view of the example portable electronic device through the line 202 of FIG. 2, in accordance with the present disclosure.

The actuator 120 may comprise one or more piezoelectric (piezo) actuators that provide tactile feedback. FIG. 2 is front view of an example of a portable electronic device 100. In the example shown in FIG. 2, the actuator 120 comprises four piezo actuators 120, each located near a respective corner of the touch-sensitive display 118. FIG. 3 is a sectional side view of the portable electronic device 100 through the line 202 of FIG. 2. Each piezo actuator 120 is supported within the portable electronic device 100 such that contraction of the piezo actuators 120 applies a force against the touch-sensitive display 118, opposing a force externally applied to the display 118. Each piezo actuator 120 includes a piezoelectric device 302, such as a piezoelectric disk adhered to a substrate 304, such as a metal substrate. An element 306 that is advantageously at least partially flexible and comprises, for example, hard rubber may be located between the piezoelectric device 302 and the touch-sensitive display 118. The element 306 does not substantially dampen the force applied to or on the touch-sensitive display 118. In the example shown in FIG. 2 and FIG. 3, the force sensor 122 comprises four force sensors 122 located between the element 306 and the substrate 304. The force sensors 122 are utilized to determine a value related to the force at each of the force sensors 122 when an external force is applied to the touch-sensitive display 118. Each force sensor 122 may also be utilized to determine a value related to force, applied by a respective actuator 120, on the touch-sensitive display 118. The substrate 304 bends when the piezoelectric device 302 contracts diametrically due to build up of charge at the piezoelectric device 302 or in response to an external force applied to the touch-sensitive display 118. The charge may be adjusted by varying the applied voltage or current, thereby controlling the force applied by the piezo actuators 120 on the touch-sensitive display 118. The charge on the piezo actuators 120 may be removed by a controlled discharge current that causes the piezoelectric devices 302 to expand diametrically, decreasing the force applied by the piezo actuators 120 on the touch-sensitive display 118. Absent an external force applied to the touch-sensitive display 118 and absent a charge on the piezoelectric device 302, the piezo actuator 120 may be slightly bent due to a mechanical preload.

Figure 4:
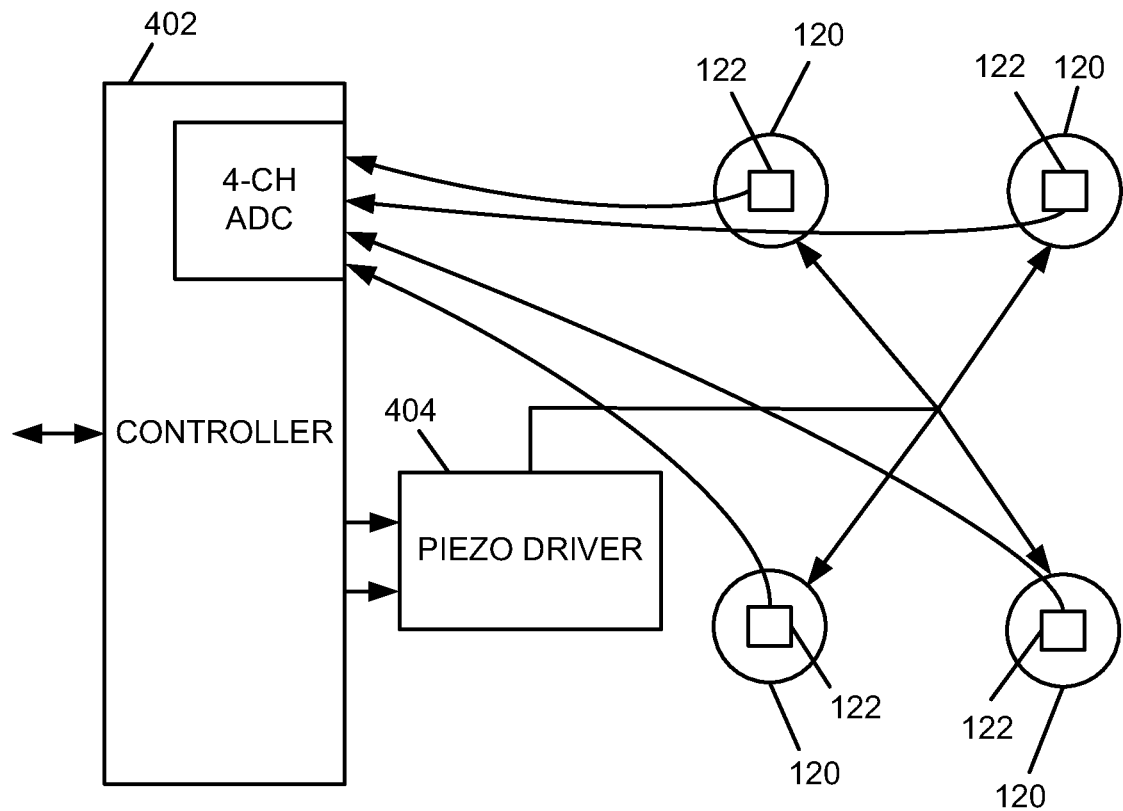
FIG. 4 is a functional block diagram showing an example of components of the example portable electronic device in accordance with the present disclosure.

A functional block diagram of components of the portable electronic device 100 is shown in FIG. 4. In this example, each force sensor 122 is connected to a controller 402, which includes an amplifier and analog-to-digital converter (ADC). The force sensors 122 may be, for example, force-sensing resistors in an electrical circuit such that the resistance changes with force applied to the force sensors 122. As applied force on the touch-sensitive display 118 increases, the resistance decreases. This change is determined via the controller 116 for each of the force sensors 122, and a value representative of the force at each of the force sensors 122 is determined.

The piezo actuators 120 are connected to a piezo driver 404 that communicates with the controller 402. The controller 402 is also in communication with the main processor 102 of the portable electronic device 100 and may receive and provide signals to and from the main processor 102. The piezo actuators 120 and the force sensors 122 are operatively connected to the main processor 102 via the controller 402. The controller 402 controls the piezo driver 404 that controls the current/voltage to the piezoelectric devices 302 and thus controls the charge and the force applied by the piezo actuators 120 on the touch-sensitive display 118. Each of the piezoelectric devices 302 may be controlled substantially equally and concurrently. Optionally, the piezoelectric devices 302 may be controlled separately. Tactile feedback is provided by controlling the piezoelectric devices 302. For example, when an applied force on the touch-sensitive display 118 exceeds a depression threshold, the charge at the piezo actuators 120 is modulated to impart a force on the touch-sensitive display 118 to simulate depression of a dome switch. When the applied force, on the touch-sensitive display 118, falls below a release threshold, after simulation of depression of a dome switch, the charge at the piezo actuators 120 is modulated to impart a force, by the piezo actuators 120, to simulate release of a dome switch.

Figure 5:
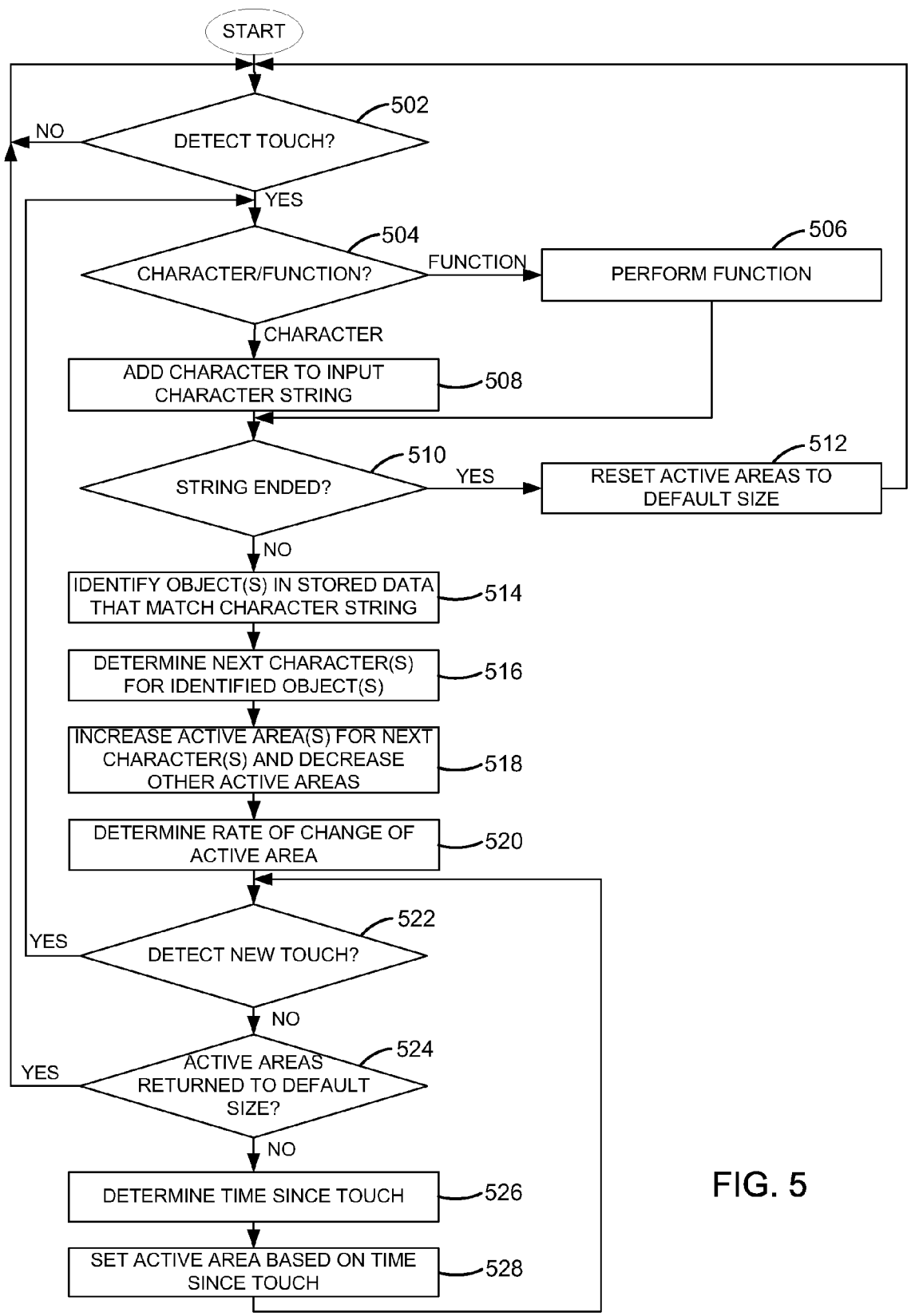
FIG. 5 is a flowchart illustrating a method of controlling a portable electronic device to facilitate input in accordance with the present disclosure.

A flowchart illustrating a method of controlling the electronic device 100 is shown in FIG. 5. The method may be carried out by software executed by, for example, the processor 102. Coding of software for carrying out such a method is within the scope of a person of ordinary skill in the art given the present description.

When a touch is detected 502 on the touch-sensitive display 118, the location of the touch is determined and a selectable feature that is associated with the location of touch is determined. The selectable feature may be any suitable selectable feature including, for example, an alphanumeric character, symbol, or function from a keyboard or keypad, that is associated with an area on the touch-sensitive display 118. Each selectable feature is associated with an area on the touch-sensitive display 118. The area associated with the selectable feature is also referred to herein as the active area. When the location of touch is within an active area associated with a function at 504, the function is performed 506 and the process continues at 508. When the location of touch is within an active area associated with a character at 504, the character is added 508 to a character string entered on the portable electronic device 100. When no character is in the character string, the character is added as a first character in the character string. When a character or characters are already entered in the character string, the character is added to the string. When the character string is ended at 510, the active areas are set or reset 512 to a default size. The character string may be ended by characters such as a space or a period, or may be ended by a function such as a return or enter function. When the character string is not ended at 510, the process continues at 514.

The portable electronic device 100 includes stored data that comprises, for example, one or more dictionaries, as well as words, acronyms, and other character combinations previously entered into the portable electronic device, each of which is referred to herein as an object. The stored data may be found, for example, in memory 110. Objects that at least partially match the character string are determined 514. Matching may include, for example, matching of the entire character string with the initial part of an object, without any missing or different characters. For example, when "fur" is the character string, matches may include "further" and "furry" but not "future." The matching process may additionally include matching all but one or two characters between the character string and the initial part of an object, i.e., partial matching where, e.g., 0, 1, or 2, unmatched characters are present between the object and the character string. Although any number of unmatched characters may be permitted, more unmatched characters result in more identified objects and a longer search time. Partial matching may allow for typographical errors that may occur. Capitalization of letters may be ignored for the purpose of matching.

For one or more of the objects that at least partially match the character string, the next character of each matching object is determined 516. The next character is the character of an object that follows the last "matching" character with the character string. In the case where partial matching is utilized, the last "matching" character may not actually be a match between the object and the character string, but rather the character in the object that aligns with the character string. In other words, the character, from the object, that may subsequently be entered in the character string is a "next character." When the character string is considered to match the entire object, the next character may be a space, a period or another punctuation mark, or a control character such as a return or enter character, line break character, page break character, tab character, and so forth. The collection of the next characters for each of the objects identified as matching at 514 is referred to as the set of next characters. The next character may be determined for fewer than all of the identified objects. For example, context of the word may be utilized to reduce the number of objects. Context may include whether a word prior to the string is grammatically correct with an object. Context may include whether or not the string is at the beginning of a sentence. Frequency of use may also be utilized to identify objects that are commonly used or to eliminate objects that are not commonly used. The active areas associated with the characters of the set of next characters are increased 518 and the active areas associated with other characters that are not included in the set of next characters, are decreased. The rate of change of the active areas is also determined 520. The rate of change of the active areas is the rate at which the active areas return to a default size.

The rate of change may be determined based on any suitable factor, such as, the time between touches on the touch-sensitive display 118, the average time between touches on the touch-sensitive display 118, the force of a touch on the touch-sensitive display 118, the average force of touches on the touch-sensitive display 118, a field of text being populated, a previous string entered, a combination of any of these factors, and any other suitable factor. For example, when a user types utilizing a virtual keyboard on the touch-sensitive display 118, the time between touches on the virtual keyboard may be determined and an average time may be determined. When the time between touches increases and the typing speed is slow compared to an average typing speed, the rate of change of the active areas may be increased such that the active areas return to the default size at a faster rate. When the time between touches increases, the probability that a word or string that is not in the dictionary is being entered, may be increased. Therefore, the active areas are returned to the default size at an increased rate, or in less time, to facilitate entry of strings that are less likely to match objects stored in memory 110. The magnitude of the increase in the rate of change of active areas may be determined based on, for example, the magnitude of the difference between the average time between touches and the time between recent touches. For example, the average time between touches may include a large sample of touches during typing on a virtual keyboard and may continually be calculated or may be determined utilizing any suitable number of touches. The time between recent touches may include a reduced number of touches such that the time between recent touches is determined utilizing the time between, for example, four most recent touches or touches for the current string.

In another example, when a user types utilizing a virtual keyboard on the touch-sensitive display 118, the force of a touch may be determined and an average force of touches may be determined. When the force of the touch increases, the rate of change of the active areas may be increased such that the active areas return to the default size at a faster rate. When the force of the touch increases, the probability that a word or string that is not in the dictionary is being entered, may be increased. Therefore, the active areas are returned to the default size at an increased rate to facilitate entry of strings that are less likely to match an object stored in memory 110. The magnitude of the increase in the rate of change of active areas may be determined based on, for example, the magnitude of the difference between the average force of a touch and the force of the current touch or touches for the current string.

In another example, when information is entered into fields such as a "To" or "From" field in an email composition interface, the string being entered may be less likely to be a string that matches an object in memory 110. The active areas may be returned to the default size at an increased rate to facilitate entry of strings that are less likely to match an object stored in memory 110.

In another example, when a previous string is determined to be a first name, a next string entered is more likely a last name and is less likely to match an object stored in memory 110. Again, the active areas may be returned to the default size at an increased rate to facilitate entry of strings that are less likely to match an object stored in memory 110.

The rate of change of the active areas may be a linear or non-linear rate of change. The rate of change may be incremented or decremented based on the factors described above. For example, a linear rate of change may be increased such that the total time for an active area that is increased in size to return to a default size, is decreased by a suitable increment. A linear rate of change may also be increased such that a size of the active area that is increased in size changes to a next smaller size at a regular interval until the size of the active area is returned to the default size.

When a new touch is detected 522, the process continues at 504. When a new touch is not detected at 522, a determination is made 524 whether or not the active areas are at the default size. When the size of the active areas is the default size, the process continues at 502. When the size of the active areas is not at the default size at 524, the elapsed time since detecting the touch at 502 is determined 526. The elapsed time may be determined in any suitable manner. The elapsed time may be determined by comparing the time when the touch is detected to the current time according to an internal clock. Alternatively, a timer may be started when the touch is detected at 502 and the elapsed time determined from the timer. The active areas associated with the characters of the next set of characters, are set 528 based on the elapsed time. The active areas associated with other characters that are not included in the set of next characters, may also be set based on the elapsed time. The active areas may be set based on the rate of change determined at 520 and the process continues at 522.

The flowchart of FIG. 5 is provided as one example and is simplified for the purpose of explanation. Additional or fewer steps may be carried out.

Figure 6:
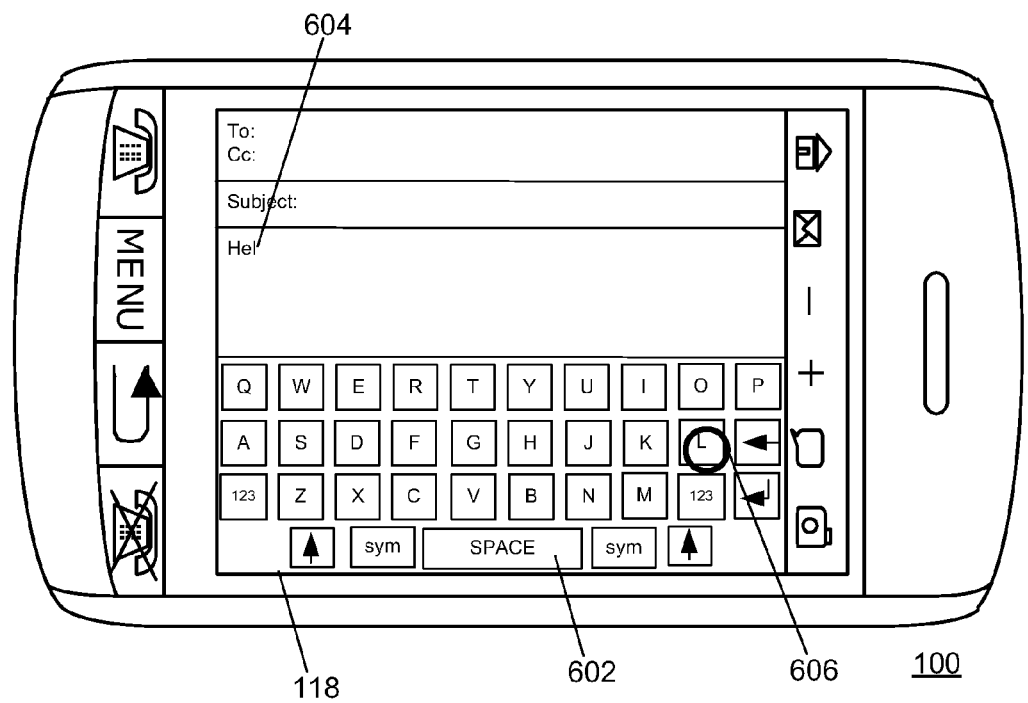
FIG. 6, FIG. 7, and FIG. 8 show examples of a virtual keyboard of the portable electronic device in accordance with the present disclosure.
Figure 7:
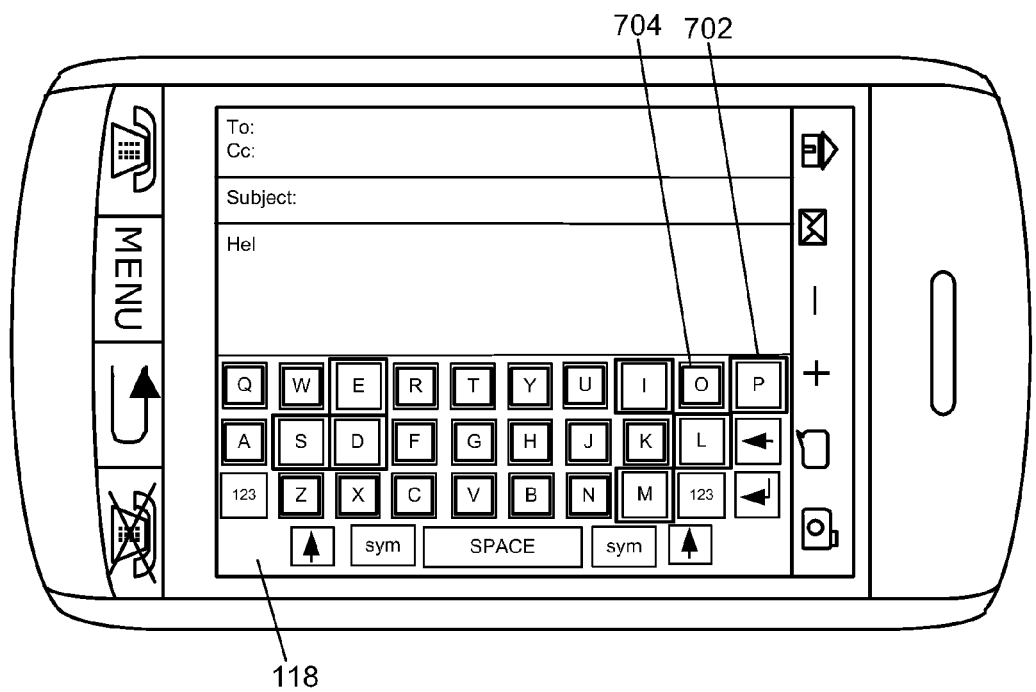
Figure 8:
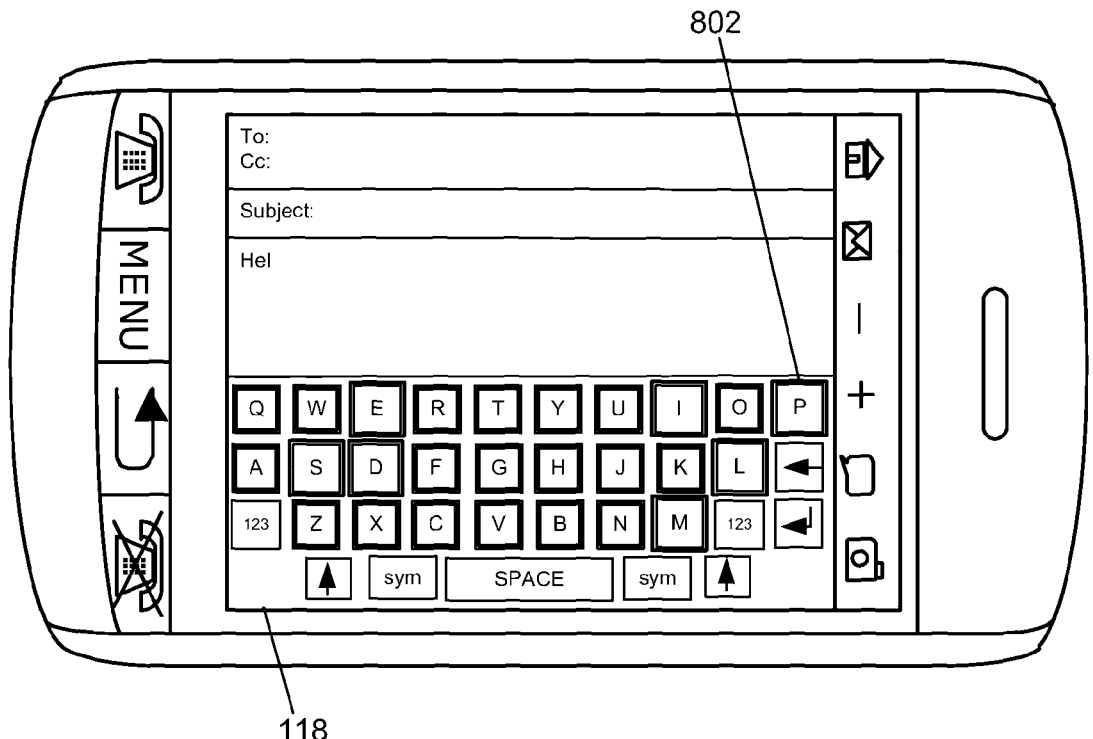

Examples of a virtual keyboard on a portable electronic device are shown in FIG. 6, FIG. 7, and FIG. 8. In these examples, the virtual keyboard 602 is rendered on the touch-sensitive display 118 to facilitate entry of data in an application, such as an email application. The character string "He" is entered in a field 604 of an e-mail, as shown in FIG. 6. A touch on the touch-sensitive overlay 114 is detected 502 at a location 606 that is determined 504 to be in the active area associated with the character "l". The character "l" is added 508 to the character string and displayed by the portable electronic device 100, resulting in the character string "Hel". The input "l" does not end 510 the character string. Matching of the character string results in objects identified 514 that include "help", "held", "hello", "Hellen", "Helsinki", "helmet", and "helicopter". In this example, for each of these objects, a match is present between the characters and the order of the characters and those of the character string. For the identified objects, the next character is determined 516 and the active area for each character of the set of next characters is increased 518. The active areas associated with other characters, that are not included in the set of next characters, are decreased. The next character is the next character in the object. Thus, the characters "p", "d", "l", "e", "s", "m", and "i" form the set of next characters. For the purpose of the present example, the active area associated with the letter "p" is equivalent to the area of the displayed key prior to detecting a touch at the active area associated with the letter "l" at 502 and the active area is increased to the area indicated by the outer square 702 surrounding the letter "p". For other characters, not included in the set of next characters, the active area is decreased. For the purpose of the present example, the active area associated with the letter "o" is equivalent to the area of the displayed key prior to detecting the touch at the active area associated with the letter "l" at 02 and the active area is decreased to the area indicated by the inner square 704, inside the letter "o". For the purpose of the present example, the size of the active areas associated with characters that are not included in the set of next characters, is reduced for alphabetical characters only. Optionally, the size of active areas associated with other features including functions and other characters may also be decreased.

Although the increase and the difference between the increased area indicated by the square 702 and the displayed key, which is equivalent to the default area, is not visible to the user, the square 702 is shown in FIG. 7 for the purpose of illustration. Similarly, the decrease and the difference between the decreased area indicated by the square 704 and the displayed key is not visible to the user. The increase in active areas associated with the set of next characters and the decrease in active areas of associated with other characters, from the size of the displayed key to the increased area, facilitates more accurate selection of characters of the set of next characters. For example, increased chance of selection of the character "p" is facilitated. Similarly, the respective active areas associated with each of the characters "d", "l", "e", "s", "m", and "i" are increased as shown in FIG. 7. The increase in each active area associated with the characters of the set of next characters and decrease in active areas associated with other characters, facilitates selection the characters of the set of next characters.

The rate of change of the active areas is determined at 520. For the purpose of the present example, the rate of change of the active areas is a default rate of change and is set such that the size of the active areas returns to the default size within a period of time and the size of the active areas is reduced in increments. For example, the size of the active areas may return to the default size within 1 second and the size of the active areas associated with the set of next characters is reduced every 0.05 seconds until the size of the active area returns to the default size. Similarly, the size of the active areas of other characters is increased every 0.05 seconds until the size returns to the default size. Therefore, when a new touch is not detected 522 and the active area is not yet at the default size at 524, the elapsed time since the touch is determined 526 and the active area set 528 based on that time. For example, after 0.5 seconds, the active area for the letter "p" may be reduced to the area outlined by the square 802 in FIG. 8. After 1 second, the active area is reduced back to the default size, which is equivalent to the size of the displayed key.

As described above, the rate of change may be dependent on a number of factors, for example, when the time between touches exceeds an average time by a threshold amount, the size of the active areas associated with the characters of the set of next characters may be reduced back to the default size within a shorter period of time. In the example above in which the default time is 1 second, the rate of change may be set such that the active area is reduced back to the default size within 0.5 seconds.

Figure 9:
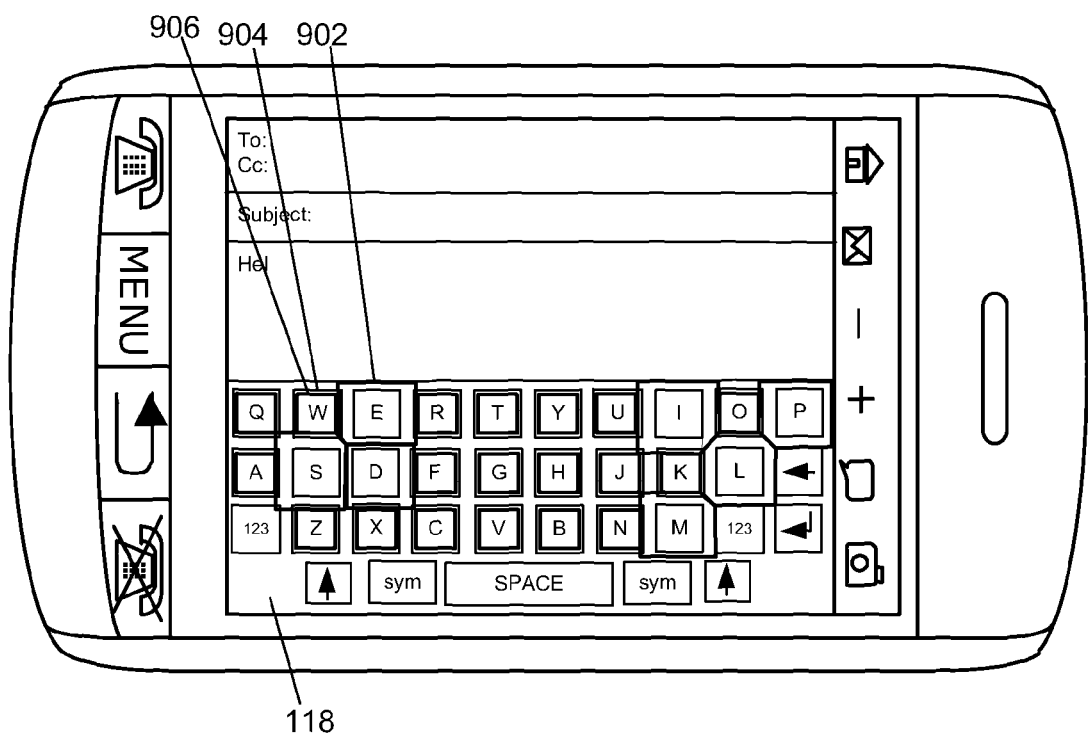
FIG. 9 shows another example of a virtual keyboard of the portable electronic device in accordance with the present disclosure.

FIG. 9 shows another example of a virtual keyboard displayed on a touch-sensitive display 118. In the example shown in FIG. 9, the next character is determined and the active area for each character of the set of next characters is increased. The active areas associated with other characters, that are not included in the set of next characters, are decreased. The active areas associated with the characters of the set of next characters is increased such that the active area associated with a character of the set of next characters overlaps with an area that was part of the active area, prior to the decrease in size, associated with an other character that are not included in the set of next characters. As shown, the active area 902 associated with the character "e", for example, increases to overlap the previous active area 904 associated with the character "w". The active area associated with the character "w" is decreased to the area indicated by the reference numeral 906, however. In other words, a portion of the area by which the active area of "w" is decreased, is added to the active area associated with the character "e". Thus, the active areas of the characters of the set of next characters are increased at the expense of the active areas of the other characters that are not included in the set of next characters.

In the example shown and described, the method is applied to each character of the character string. In an alternative embodiment, a minimum number of characters may be required prior to applying the method.

In addition to increasing the active areas for the next characters, e.g., "p", "d", "l", "e", "s", "m", and "i", the respective areas 500 of the displayed representations of the characters may be increased on the touch-sensitive display 118. Other visual attributes of the displayed representations of the characters, which in the example of FIG. 6 through FIG. 8 include keys of a keyboard, may also be changed. For example, the keys may be displayed in an alternative color or with some other indicator to draw attention to the keys.

In other examples, the identified objects may include contact data stored in a contacts database and contact data that have at least partially match the character string. Such identification is useful during, for example, searching for contact data for information or for placing a call, populating an email address, populating an SMS or MMS address, and so forth.

In the examples described above, the sizes of the active areas are changed back to a default size over a period time. Rather than changing the sizes of the active areas back to a default size over a period of time, the size of the active areas associated with the characters included in the set of next characters may be reduced to a set size that is larger than the default size and smaller than the size to which the area is increased immediately following detection of the touch. Similarly, the size of the active areas associated with characters that are not included in the set of next characters may be increased to a different set size that is smaller than the default size and larger than the size to which the area is decreased immediately following detection of the touch.

Objects from stored data at the electronic device are compared to a string of characters entered at the electronic device to determine possible subsequent input. The active area for the next characters may be increased in size to facilitate more accurate character entry. The increase in active areas for the set of next characters and corresponding decrease in active areas for other characters facilitates increased typing speed and decreases the chance of erroneous input using a virtual keyboard on a touch-sensitive display, thereby reducing device use time and power consumption and increasing battery life. The change in size of the active areas is temporary and, after a period of time absent a further touch on the touch-sensitive display, the active areas are returned to the default size. The time between detecting the touch and returning the active areas to the default size may be dependent on factors including time between touches and force of touch. Changing the size of the active areas based on time between detecting the touch and returning the active areas to the default may facilitate entry of strings that are not stored on the portable electronic device.

According to one aspect, a method of controlling an electronic device that has a touch-sensitive display includes detecting a touch at an area associated with a character displayed on the touch-sensitive display, adding the character to a character string, identifying, from stored data, objects that at least partially match the character string, determining a next character of ones of the objects identified to yield a set of next characters, increasing a size of an area associated with each character of the set of next characters, and reducing the size of the area associated with each character of the set of next characters with time absent detection of a further touch.

According to another aspect, a computer-readable medium has computer-readable code executable by at least one processor of the portable electronic device to perform the above method.

According to another aspect, an electronic device includes a touch-sensitive display, a memory, and a processor connected to the touch-sensitive display and the memory to detect a touch at an area associated with a character displayed on the touch-sensitive display, add the character to a character string, identify, from stored data, objects that at least partially match the character string, determine a next character of ones of the objects identified to yield a set of next characters, increase a size of an area associated with each character of the set of next characters, and reduce the size of the area associated with each character of the set of next characters with time absent detection of a further touch.

While the embodiments described herein are directed to particular implementations of the portable electronic device and the method of controlling the portable electronic device, modifications and variations may occur to those skilled in the art. All such modifications and variations are believed to be within the sphere and scope of the present disclosure. The described embodiments are to be considered in all respects as illustrative and not restrictive. The scope of the disclosure is, therefore indicated by the appended claims rather than by the foregoing description. All changes that come within the meaning and range of equivalency of the claims are to be embraced within their scope.

What is claimed is:

1. A method of controlling an electronic device having a touch-sensitive display, the method comprising:
    detecting a touch at an area associated with a character displayed on the touch-sensitive display;
    adding the character to a character string;
    identifying, from stored data, objects that at least partially match the character string;
    determining a next character of ones of the objects identified to yield a set of next characters;
    increasing a size of an area associated with each character of the set of next characters; and
    absent detection of a further touch, reducing the size of the area associated with each character of the set of next characters with time at a rate dependent on a factor related to touch-sensitive display operation.

2. The method according to claim 1, wherein reducing the size of the area comprises reducing the size of the area associated with each character of the set of next characters with time until a further touch is detected or until the size of each area reaches a set size.

3. The method according to claim 1, wherein reducing the size of the area associated with each character of the set of next characters at a rate dependent on a factor comprises reducing the size at a rate dependent on an average time between touches on the touch-sensitive display.

4. The method according to claim 1, wherein reducing the size of the area associated with each character of the set of next characters at a rate dependent on a factor comprises reducing the size at a rate dependent on force of the touch on the touch-sensitive display.

5. The method according to claim 1, wherein reducing the size of the area associated with each character of the set of next characters at a rate dependent on a factor comprises reducing the size at a rate dependent on an average force of touches on the touch-sensitive display.

6. The method according to claim 1, wherein reducing the size of the area associated with each character of the set of next characters at a rate dependent on a factor comprises reducing the size at a rate dependent on a field being populated.

7. The method according to claim 1, wherein reducing the size of the area associated with each character of the set of next characters at a rate dependent on a factor comprises reducing the size at a rate dependent on a previously entered string.

8. The method according to claim 1, wherein identifying objects comprises identifying language objects stored in memory on a portable electronic device.

9. The method according to claim 1, comprising returning the size of the area associated with each next character of the set of next characters to a set size when the character string is ended.

10. The method according to claim 9, comprising starting a new character string in response to detecting a touch at an area associated with another character displayed on the touch-sensitive display after the character string is ended.

11. The method according to claim 1, wherein the character and the set of next characters are displayed in a virtual keyboard on the touch-sensitive display.

12. The method according to claim 11, comprising changing a visual attribute of a displayed representation of each next character.

13. The method according to claim 1, comprising reducing area size of areas associated with other characters that are not included in the set of next characters in response to detecting the touch and increasing the area size of the areas associated with each of the other characters with time absent detection of the further touch.

14. A non-transitory computer-readable medium having computer-readable code embodied therein executable by at least one processor in an electronic device comprising a touch-sensitive display connected to the at least one processor and a memory connected to the at least one processor, to cause the electronic device to detect a touch at an area associated with a character displayed on the touch-sensitive display, add the character to a character string, identify, from stored data, objects that at least partially match the character string, determine a next character of ones of the objects identified to yield a set of next characters, increase a size of an area associated with each character of the set of next characters, and absent detection of a further touch, reduce the size of the area associated with each character of the set of next characters with time at a rate dependent on a factor related to touch-sensitive display operation.

15. An electronic device comprising:
a touch-sensitive display;
a memory; and
a processor connected to the touch-sensitive display and the memory to detect a touch at an area associated with a character displayed on the touch-sensitive display, add the character to a character string, identify, from stored data, objects that at least partially match the character string, determine a next character of ones of the objects identified to yield a set of next characters, increase a size of an area associated with each character of the set of next characters, and absent detection of a further touch, reduce the size of the area associated with each character of the set of next characters with time at a rate dependent on a factor related to touch-sensitive display operation.

* * * * *